AUTOMATIC FREQUENCY CONTROL

Original Filed June 6, 1963 2 Sheets-Sheet 1

INVENTOR.
JOHN STARK, JR.
BY
W. H. Sprague
Attorney

AUTOMATIC FREQUENCY CONTROL

Original Filed June 6, 1963 2 Sheets-Sheet 2

INVENTOR.
JOHN STARK, JR.
BY
W. H. Spangle
Attorney

United States Patent Office

Re. 26,686
Reissued Oct. 7, 1969

26,686

AUTOMATIC FREQUENCY CONTROL

John Stark, Jr., Indianapolis, Ind., assignor to Radio Corporation of America, a corporation of Delaware Original No. 3,264,408, dated Aug. 2, 1966, Ser. No. 286,075, June 6, 1963. Application for reissue July 22, 1968, Ser. No. 764,351
Int. Cl. H04n *3/16, 5/38*
U.S. Cl. 178—7.3 6 Claims

Matter enclosed in heavy brackets [ ] appears in the original patent but forms no part of this reissue specification; matter printed in italics indicates the additions made by reissue.

*ABSTRACT OF THE DISCLOSURE*

*A phase detector is described for automatic frequency control of the horizontal oscillator in a television receiver. The circuit includes a pair of peak detectors arranged so that they are effectively in parallel with respect to incoming horizontal sync pulses derived from the sync separator and in series opposition with respect to pulses derived from the horizontal oscillator and output circuit. When the two applied pulse trains are exactly in phase, the peak detectors produce outputs which cancel. When an out of phase condition occurs, incomplete cancellation results and a control voltage is applied to the horizontal oscillator to shift its frequency. One of the peak detectors normally has an enhanced response to low frequency components in the applied signals compared to that of the other peak detector. Accordingly, since it is desirable to balance out the overall response of the peak detector to these low frequency components, an impedance means is added in the circuit to render the response characteristic of the peak detectors more nearly equal. Equalizing the responses of the peak detectors thereby effects a more complete cancellation of these components of the applied signals and the overall response of the phase detector to low frequencies is attenuated.*

The present invention relates to an automatic frequency control circuit. More particularly the present invention relates to a phase detection circuit for automatically controlling the frequency of the horizontal deflection oscillator in a television receiver.

In television receivers, a local horizontal deflection oscillator controls the repetition rate of the horizontal deflection circuit used for reproducing the televised image on the screen of the cathode ray tube. This oscillator must be properly synchronized with the oscillator at the TV transmitter which originally produced the televised image. The transmitted signal accordingly is a composite signal containing both video information and horizontal and vertical synchronizing signals for the purpose of synchronizing the horizontal and vertical deflection oscillators at the television receiver. In this manner accurate reproduction of the televised image may be obtained.

Phase detector circuits have been developed for comparing the time of occurrence of the horizontal synchronizing signal with the output of the horizontal oscillator in the television receiver. With such circuits, an output voltage is obtained which is a function of the difference in the time of occurrence between the output of the oscillator and the synchronizing signal.

While these phase detector circuits are generally satisfactory for television viewing purposes there is room for improvement. For example, when the television channel to which the receiver is tuned is changed, there may be momentary loss of synchronization before the control circuit starts to operate properly. Also, if there is loss of synchronization between the receiver and the transmitter for any reason, the recovery time of conventional phase detection circuits may not be as rapid as desired.

It is accordingly an object of the present invention to provide a new and improved automatic frequency control circuit which overcomes the above disadvantages.

A second object of the present invention is to provide a new and improved automatic frequency control for the horizontal oscillator of a television receiver.

Another object of the present invention is to provide a phase detector circuit for a television receiver which has improved frequency response.

Still another object of the present invention is to provide a new and improved phase detector for the horizontal deflection oscillator of a television receiver which detector has a faster recovery time than is presently available.

The present invention contemplates an automatic frequency control arrangement including a pair of peak detector circuits; a first source of periodic signals occurring at a first frequency and having an output applied to the pair of peak detectors arranged in parallel; a second source of periodic signals occurring at substantially the first frequency and having an output applied to the pair of peak detector circuits arranged in series opposition, the pair of peak detector circuits thereby producing a control voltage which is a function of any phase difference between the periodic signals of the first and second sources; and means tending to balance the voltage developed by the detector circuit. Control means are also included responsive to the control voltage and connected to the second source of periodic signals for changing the rate of occurrence of the periodic signals of the second source in a direction to reduce the difference in frequency of the two periodic signals to zero. The balancing means not only tends to balance the detector circuit voltages, but gives the circuit a faster response, reduces ringing, and has other advantages.

The novel features which are considered as characteristic for the invention are set forth in particular in the appended claims. The invention itself, however, both as to its construction and its method of operation together with additional objects and advantages thereof will best be understood from the following description of specific embodiments when read in connection with the accompanying drawings in which:

Figure 1:
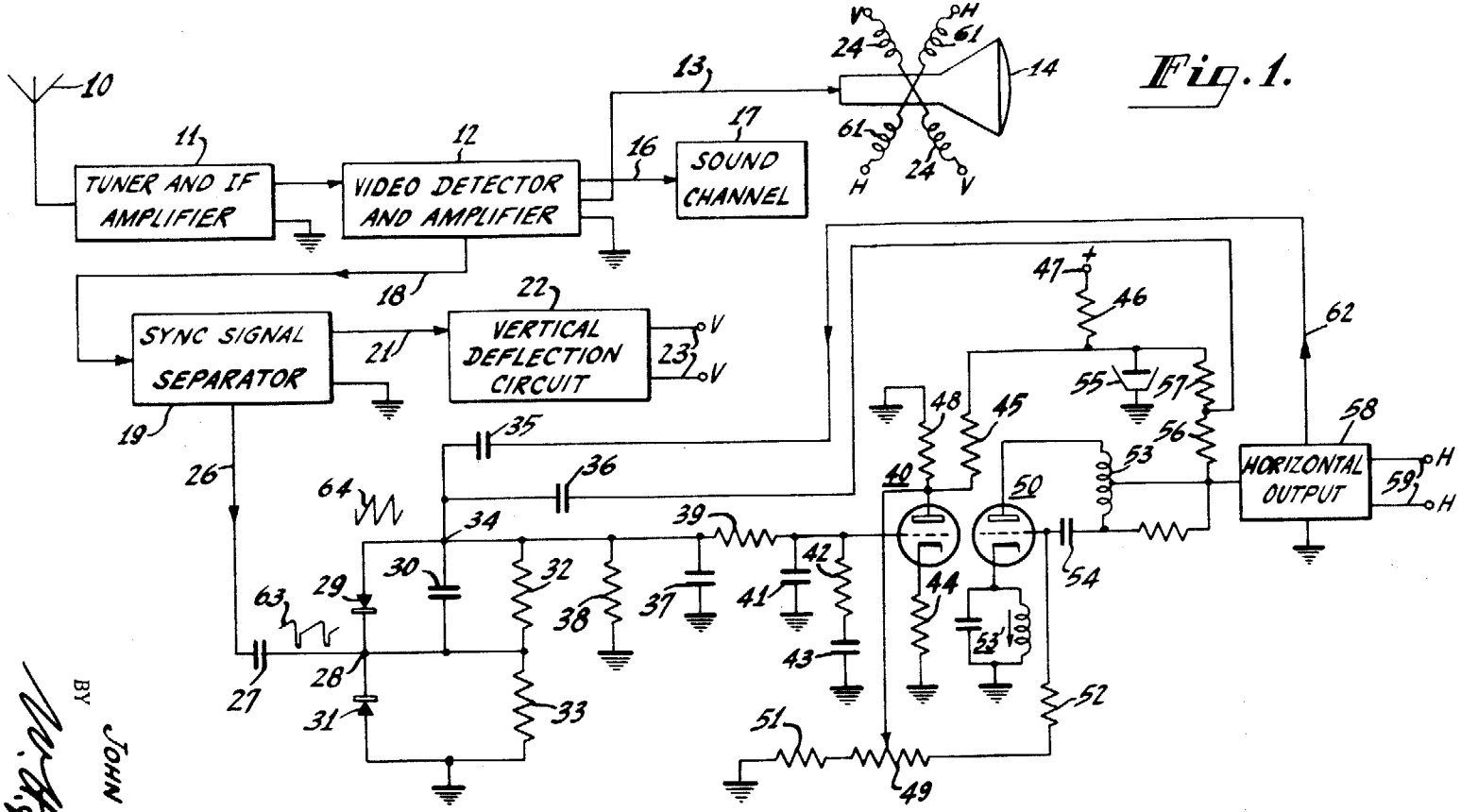
FIGURE 1 is a schematic diagram partially in block form of a circuit incorporating the principles of the present invention.

Referring to the drawings and more particularly to FIGURE 1 the composite signals transmitted by a television transmitter are received by an antenna 10 and applied to the radio frequency (RF) tuner and the intermediate frequency (IF) amplifier represented by the block 11. The IF signals produced by the intermediate frequency amplifier of block 11 are applied to the video detector and video amplifier represented by the block 12. At this stage of the television receiver, in accordance with conventional practice, the video information to be displayed on the screen of the cathode ray tube and the synchronizing signals have been demodulated from the RF carrier signal. The output signal from the video amplifier of the block 12 is applied on conductor 13 to the cathode ray tube 14 to be displayed on the screen thereof.

A second output signal obtained from the block 12 is the modulated sound signal which is applied on conductor 16 to the sound channel 17 wherein it is demodulated and reproduced in synchronism with the displayed image. The apparatus represented by the blocks 11, 12 and 17 may be constructed in any one of several conventional configurations and a complete illustration of these circuits is not provided in order to avoid unnecessarily complicating the drawings.

A third output signal from the block 12 is applied on conductor 18 to the synchronizing signal separator 19. The synchronizing signal separator 19 operates in a conventional manner to separate the horizontal synchronizing signals from the vertical synchronizing signals and from the video signals, all of which are contained in the original signals received by the antenna 10.

The vertical synchronizing signals are applied from the sync separator 19 on conductor 21 to a vertical deflection circuit 22. The vertical deflection circuit 22 produces a sawtooth current which is applied from its output terminals 23 to the terminals V—V of the vertical deflecting coils 24 of the cathode ray tube 14.

Also produced at the output of the sync separator 19 on a conductor 26 are the horizontal synchronizing signals which are applied through a coupling capacitor 27 to the junction point 28 between diodes 29 and 31 which form a portion of the phase detection circuit. The diode 29 has a load resistor 32 and a compensating capacitor 30 connected in parallel therewith while diode 31 is connected in parallel with a load resistor 33. The junction between the anode of the diode 31 and the resistor 33 is connected to a source of datum potential or ground for the television receiver.

The junction of the anode of the diode 29, the capacitor 30 and the resistor 32 is identified by the numeral 34. Junction point 34 is connected to one terminal of a frequency response compensating resistor 38, the other terminal of which is grounded, and to one terminal of a load capacitor 37 and a resistor 39. The other terminal of capacitor 37 is grounded while resistor 39 is connected to one terminal of, and forms an integrating network with a capacitor 41 the other terminal of which is grounded.

The junction between resistor 39 and capacitor 41 is connected to the control electrode of a horizontal control tube 40. The control electrode of tube 40 is connected to ground by the series combination of a resistor 42 and a capacitor 43. The cathode of tube 40 is connected to ground by a bias resistor 44 and the anode thereof is connected by means of anode resistors 45 and 46 to the positive terminal 47 of a source of operating potential. The junction between resistors 45 and 46 is bypassed to ground by capacitor 55. The anode of tube 40 is connected to ground through biasing resistor 48 and to the movable tape of a horizontal hold potentiometer 49. One end of potentiometer 49 is connected to ground by means of resistor 51 while the other end of potentiometer 49 is connected to the control electrode of a horizontal oscillator tube 50 by means of a resistor 52.

The cathode of oscillator tube 50 is connected to ground by the tuned circuit 53' made up of a variable inductor and a capacitor. The anode of tube 50 is coupled to the control electrode thereof by means of a tapped inductor 53 and capacitor 54 in series. The anode of tube 50 is also connected to the positive terminal 47 of the source of operating potential by means of anode resistors 56, 57 and 46 connected in series from the terminal 47 to the tap on tapped inductor 53. The periodic signals from the oscillator tube 50 are applied from the inductor 53 to the input of the block 58 representing the horizontal output circuit of the television receiver.

In accordance with conventional practice, the horizontal output circuit 58 includes a horizontal output tube and an output transformer in which is developed the sawtooth currents for the horizontal deflection coils of the cathode ray tube. These currents are applied on output terminals 59 to the terminals H—H of the horizontal deflecting coils 61 of the cathode ray tube 14. The horizontal output tube is alternately rendered conductive and nonconductive at each cycle of the oscillations produced by the oscillator 50 to provide the horizontal deflection currents in accordance with conventional reaction scanning techniques.

The oscillatory output of the tube 50 is also fed back to the phase detector circuit by means of a coupling capacitor 36 connected from the junction between resistors 56 and 57 to the junction point 34. Also fed back to the phase detection circuit are sawtooth pulses produced by the horizontal output circuit 58. These sawtooth pulses are connected by conductor 62 through coupling capacitor 35 to the junction point 34.

In operation, the phase detector circuit has two inputs, namely the junction point 28 and the junction point 34. To the junction point 28 are applied the horizontal synchronizing signals from the sync signal separator 19 which may have the shape illustrated in FIGURE 1 by the waveform 63. These represent a series of first periodic signals occurring at the horizontal synchronizing scanning rate as established by the transmitted composite signal.

To the junction point 34 are applied the outputs from the horizontal oscillator tube 50 and the horizontal output circuit 58. The waveform applied to the junction point 34 as a series of second periodic signals is represented by the waveform 64 in FIGURE 1. Since the horizontal oscillator tube 50 is tuned to oscillate at substantially the horizontal scanning frequency both waveforms 63 and 64 occur at substantially the same repetition rate or frequency.

The load for the phase detector circuit may be taken as the capacitor 37, filters 39, 41, and the input circuit of the horizontal control tube 40 ignoring for the time being the resistor 38. The peak detector circuits represented respectively by diode 29 with its load resistor 32 and diode 31 with its load resistor 33 appear in parallel to the horizontal synchronizing signals 63 applied to the junction 28. These same peak detector circuits appear in series to the signal 64 applied to the junction 34. In accordance with known balanced phase detection techniques, a voltage is produced across the capacitor 37 which is a function of the difference in phase between the horizontal synchronizing signals applied to junction 28 and the signals applied to junction 34. Briefly, the peak detectors made up of diode 29 and resistor 32 and diode 31 and resistor 33 produce average voltages across the respective resistors 32 and 33 which are equal approximately to the peak of the negative pulses of the horizontal synchronizing signals 63 superimposed in opposite polarities on the horizontal output signals 64, during retrace time.

If the sawtooth pulses 64 applied to junction 34 are exactly in phase with the horizontal synchronizing pulses 63, the sawtooth voltage is passing through its A.C. axis in one direction, say negative going, in this case, at the same instant that the horizontal synchronizing pulse, also negative going, is causing the diodes 29 and 31 to conduct. Therefore, during such in-phase conditions there will be no D.C. voltage developed across the resistors 32 and 33, i.e., the respective voltages across these resistors is thereorectically balanced out. If the horizontal oscillator is operating at a lower frequency so that the fedback sawtooth pulses 64 lag the horizontal synchronizing pulses 63 a negative voltage (with the polarities indicated for the applied signals) will be developed across capacitor 37 and applied to the horizontal control tube to speed up the oscillator 50. If the horizontal oscillator is operating at a higher frequency the sawtooth pulses applied to junction 34 will occur before the horizontal sync pulses and lead these pulses. Accordingly a positive voltage will be developed and applied to the horizontal control tube to slow down the oscillator. Hence the oscillator tends to be stabilized at a synchronous frequency substantially in phase with the horizontal synchronizing voltage.

Figure 2:
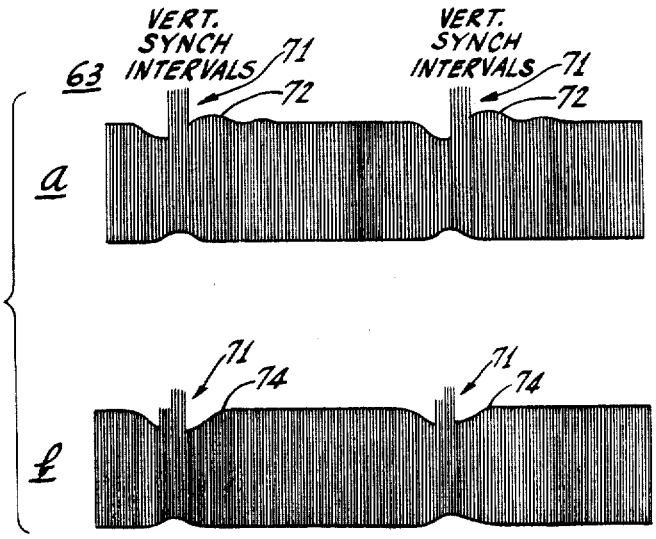
FIGURES 2 and 3 are graphical representations of the wave shapes occurring at different portions of the circuit for the purpose of illustrating the advantageous operation thereof.
Figure 3:
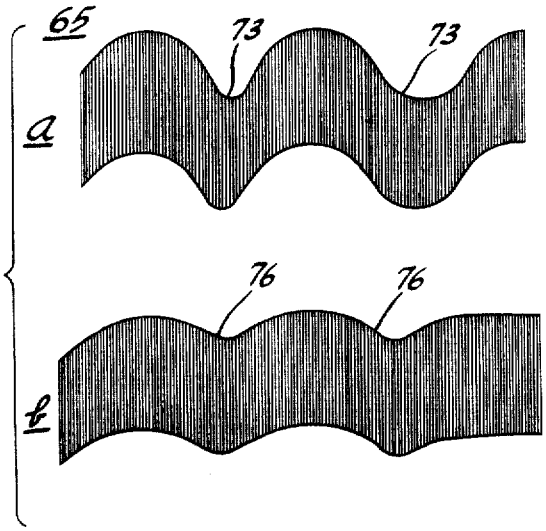

The conventional balanced phase detector, as its operation is thus far described, may have several disadvantages, as illustrated by the waveforms in FIGURES 2a and 3a, which disadvantages the circuit of FIGURE 1 will substantially eliminate. The waveforms of FIGURES 2*a* and 3*a* are taken in the absence of resistor 38. In FIGURE 2 and more particularly in subFIGURE 2a, the prior art waveform 63 appearing at the output of sync signal separator 19 is illustrated on a much longer time scale than that of FIGURE 1, and therefore appears greatly compressed. Two vertical synchronizing intervals 71 are shown. It can be seen that, after the occurrence of each vertical synchronizing interval, a ringing effect may be present evidenced by the damped oscillation indicated at 72 in the envelope of the waveform 2a. Due to such ringing the phase detection circuit may wander or "hunt" about the proper synchronizing frequency for the horizontal oscillator. This may cause the beginning of the displayed video signal to also hunt, possibly producing a bending of the top portion of the reproduced image.

A second possible disadvantage of prior art circuits is shown in FIGURE 3a. In this figure the waveform 65 appearing across the load capacitor 37 is illustrated on a time scale comparable to that of FIGURE 2. The average value of the waveform 65 is applied to the control electrode of the horizontal control tube 40 for correction of any phase differences between the output of the horizontal oscillator and the incoming horizontal synchronizing pulses. The dips 73 in the waveform 65 of FIGURE 3a show that there is a corresponding change or dip in the average value of the signal which occurs on those occasions when the horizontal sync of the television receiver is momentarily lost. This may occur when the receiver is switched from channel to channel or during the vertical retrace or due to interference, etc. This large change in the signal which is applied to the horizontal control tube may again contribute to hunting or loss of information in the portion of the reproduced image occurring during or immediately after such time interval.

Now consider the effect of adding the resistor 38 between the junction point 34 and ground. The resistor 38 serves as a ground return for the anode of the diode 29. In the absence of the resistor 38, the diode 31 which has a grounded anode has a much better response to low frequency components in the horizontal synchronizing signal than the diode 29. This low frequency response may cause an error signal to be applied to the horizontal control tube even though the horizontal oscillator may in fact be properly synchronized with respect to the incoming horizontal synchronizing signals.

The low frequency components which may be troublesome are generally present in the horizontal synchronizing signals occurring during the vertical sync and vertical retrace interval. By adding the ground return resistor 38 for the anode of diode 29 both of the diodes respond to the low frequency components more nearly in substantially the same manner so that these low frequency components tend to be balanced out. This balancing reduces any error signal that may be present due to the differences in the frequency response of the diodes 29 and 31.

The waveforms corresponding to those of FIGURES 2a and 3a, except that resistor 38 has now been added to the circuit, are shown in FIGURES 2b and 3b, respectively. From FIGURE 2b it can be seen that the presence of the ground return resistor 38 in the circuit substantially eliminates the ringing from portion 74 of the signal occurring immediately after the vertical blanking interval thus reducing the undesirable hunting that may otherwise be present immediately following the vertical sync interval.

Similarly, with the ground return resistor 38 present in the circuit, FIGURE 3b shows that changes in voltage due to loss of sync or other interference are reduced by the wave shaping effect of the resistor 38. The dips 76, it can be seen, are substantially smaller than the dips 73 of FIGURE 3a. Thus, utilization of the resistor 38 provides quicker recovery of the horizontal oscillator after the loss of sync that may occur for various reasons.

Thus, the output waveform of FIGURE 3b shows that the phase of the oscillator 50 signals now follows more closely the phase of the horizontal synchronizing signals than without the resistor 38. The voltage produced across capacitor 37 is applied to the control electrode of the horizontal control tube 40 by way of the filter networks made up respectively of resistor 39 and capacitor 41 and resistor 42 and capacitor 43.

The tube 40 effectively acts as a D.C amplifier, its output being applied to the control electrode of the oscillator tube 50 by way of "horizontal hold" potentiometer 49 and resistor 52. The frequency of oscillator 50 is thereby tuned by this amplified voltage to exactly the proper synchronized frequency. The output signals from tube 50 are applied to the horizontal output circuit represented by the block 58 for the production of horizontal deflection waveforms, as explained above.

Without any intent to limit the scope of the present invention a circuit utilizing the following components has been found to have the beneficial effect represented by the waveforms 2b and 3b:

Capacitor 27—47 M.M.F.
Diodes 29, 31—GE Dual Selenium
Capacitor 30—68 M.M.F.
Resistors 32, 33—390,000 ohms each
Capacitor 36—27 M.M.F.
Capacitor 37—820 M.M.F.
Resistor 38—120,000 ohms
Resistor 39—270,000 ohms As has been explained above, the improved results obtained by the circuit illustrated in FIGURE 1 have been attributed to the improved response of the diode 29 to low frequency components that may be present in the horizontal synchronizing signal. It is possible that the same results may be achieved by otherwise equalizing the respective frequency responses of each of the diodes. It might be possible for example to balance the respective low frequency responses of diodes 31 and 29 by inserting an impedance between the anode of diode 31 and ground. Since the detector is preferably solely phase sensitive, any modification which balances the responses of each of the respective diodes is desirable.

While the above invention has been described with respect to improvements in an automatic frequency control circuit for use in synchronizing a horizontal oscillator in a television receiver, it is clear that the same principles may be applied to other frequency control or phase detection circuits to achieve the benefits above described.

What is claimed is:

1. An automatic frequency control comprising, in combination, a first and a second peak detector circuit;

a source of first periodic signals occurring at a first frequency, said first periodic signals being applied to said first and second peak detector circuits arranged in parallel;

a source of periodic signals occurring at substantially said first frequency, said second periodic signals being applied to said peak detector circuits connected in series opposition, a capacitive load circuit, said first and second peak detector circuits producing a control voltage across said load circuit when said first and second periodic signals are applied thereto, said control voltage being proportional to any phase difference between said first and second periodic signals;

control means responsive to said control voltage and connected to said source of second periodic signals for changing the frequency of said periodic signals in a direction to reduce said control voltage to substantially zero; and impedance means coupled across said load circuit for substantially reducing the *combined* response of said [first] peak detector [circuit] *circuits* to low frequency variations of the periodic signals supplied by said first source thereby tending to equalize the frequency response of said peak detector circuits.

2. An automatic frequency control arrangement for television receivers comprising, in combination, a first peak detector circuit having a first parallel combination of a diode and a resistor;

a second peak detector circuit having a second parallel combination of a diode and a resistor, the anode of said diode of said second combination being arranged substantially at electrical ground potential;

a source of horizontal synchronizing pulses occurring at the horizontal synchronizing frequency of the television receiver, said signals being applied to said first and second peak detector circuits arranged in parallel;

a source of second periodic signals occurring substantially at the horizontal synchronizing frequency of the television receiver, said second periodic signals being applied to said first and second peak detector circuits arranged in series;

a capacitive load circuit coupled across the series combination of said first and second peak detector circuits;

said peak detector circuits thereby producing a control voltage across said load circuit varying as a function of the phase difference between said horizontal synchronizing pulses and said second periodic signals;

control means responsive to said control voltage for changing the frequency of said second periodic signals in a direction to reduce said phase difference substantially to zero; and impedance means coupled between the anode of the diode of said first parallel combination and ground potential across said capacitive load circuit for substantially reducing the *combined* response of said [first] peak detector *circuits* to low frequency variations of the amplitude of said horizontal synchronizing pulses thereby tending to equalize the frequency response of said peak detector circuits.

3. An automatic frequency control arrangement for television receivers comprising, in combination, a first peak detector circuit having a first parallel combination of a diode and a resistor;

a second peak detector circuit having a second parallel combination of a diode and a resistor, the anode of said diode of said second combination being arranged substantially at electrical ground potential;

a source of horizontal synchronizing pulses occurring at the horizontal synchronizing frequency of the television receiver, said signals being applied to said first and second peak detector circuits in parallel;

a source of second periodic signals occurring substantially at the horizontal synchronizing frequency of the television receiver, said second periodic signals being applied to said first and second peak detector circuits in series;

a capacitive load circuit coupled across the series combination of said first and second peak detector circuits;

said peak detector circuits thereby producing a control voltage across said load circuit varying as a function of the phase difference between said horizontal synchronizing pulses and said second periodic signals;

control means responsive to said control voltage for changing the frequency of said second periodic signals in a direction to reduce said phase difference; and impedance means including at least one resistor for returning the anode of the diode of said first parallel combination to ground potential for substantially reducing the *combined* response of said [first] peak detector *circuits* to low frequency variations of the amplitude of said horizontal synchronizing pulses thereby tending to equalize the frequency response of said peak detector circuits.

4. An automatic frequency control arrangement for television receivers comprising, in combination, a first peak detector circuit having a first parallel combination of a diode and a resistor;

a second peak detector circuit having a second parallel combination of a diode and a resistor, the anode of said diode of said second combination being arranged substantially at electrical ground potential;

a source of horizontal synchronizing pulses occurring at the horizontal synchronizing frequency of the television receiver, said signals being applied to said first and second peak detector circuits in parallel;

a source of second periodic signals occurring substantially at the horizontal synchronizing frequency of the television receiver, said second periodic signals being applied to said first and second peak detector circuits in series;

a capacitive load circuit coupled across the series combination of said first and second peak detector circuits;

said peak detector circuits thereby producing a control voltage across said load circuit varying as a function of the phase difference between said horizontal synchronizing pulses and said second periodic signals;

control means responsive to said control voltage for changing the frequency of said second periodic signals in a direction to reduce said phase difference; and impedance means including a compensating resistor for returning the anode of the diode of said first parallel combination to ground potential, the value of resistance of said compensating resistor being substantially smaller than the value of resistance of either of said resistors in said first and second parallel combinations to [reduce] *increase* substantially the low frequency response of said first peak detector without substantially affecting the low frequency response of said second peak detector.

5. An automatic frequency control arrangement for television receivers comprising a capacitive load circuit;

first and second rectifiers coupled in series opposition across said load circuit;

first and second resistors coupled respectively across said first and second rectifiers;

a first source of periodic signals of predetermined frequency;

means including said load circuit for connecting said rectifiers in parallel across said first source;

a second source of periodic signals of substantially the same predetermined frequency;

means for connecting said second source to said rectifiers in series opposition;

and impedance means coupled across said load circuit for substantially reducing the *combined* response of said [first rectifier] *rectifiers* to low frequency variations in amplitude of the periodic signals supplied by said first source thereby tending to equalize the frequency response of said rectifiers.

6. An automatic frequency control arrangement for television receivers according to claim 5 wherein the parallel combination of said first rectifier and said first resistor is connected in series relation with said capacitive load circuit across said first source and the parallel combination of said second rectifier and said second resistor is connected directly across said first source.

References Cited

The following references, cited by the Examiner, are of record in the patented file of this patent or the original patent.

UNITED STATES PATENTS

| | | | |
|---|---|---|---|
| 2,669,655 | 2/1954 | Gruen | 328—134 |
| 3,041,394 | 6/1962 | Schrecongost | 178—7.3 |

FOREIGN PATENTS

| | | |
|---|---|---|
| 1,255,296 | 1/1961 | France. |

ROBERT L. GRIFFIN, Primary Examiner

R. L. RICHARDSON, Assistant Examiner

U.S. Cl. X.R.

178—69.5; 328—133; 329—122; 331—20, 26